(12) United States Patent
Tucker et al.

(10) Patent No.: US 12,736,714 B2
(45) Date of Patent: Sep. 15, 2026

(54) SANDWICHED COLORED HYDROGEL CONTACT LENSES

(71) Applicant: Alcon Inc., Fribourg (CH)

(72) Inventors: Robert Carey Tucker, Johns Creek, GA (US); Pushkar S. Varde, Athens, GA (US); Weihong Lang, Suwanee, GA (US); Paul William Oyler, Cumming, GA (US)

(73) Assignee: Alcon Inc., Fribourg (CH)

( * ) Notice: Subject to any disclaimer, the term of this patent is extended or adjusted under 35 U.S.C. 154(b) by 639 days.

(21) Appl. No.: 18/321,828

(22) Filed: May 23, 2023

(65) Prior Publication Data

US 2023/0384482 A1 Nov. 30, 2023

Related U.S. Application Data

(60) Provisional application No. 63/365,311, filed on May 25, 2022.

(51) Int. Cl.

| | |
|---|---|
| ***G02B 1/04*** | (2006.01) |
| ***B29D 11/00*** | (2006.01) |
| ***G02C 7/04*** | (2006.01) |

(52) U.S. Cl.

CPC ........ *G02B 1/043* (2013.01); *B29D 11/00125* (2013.01); *G02C 7/04* (2013.01)

(58) Field of Classification Search

CPC ............ G02B 41/043; B29D 11/00125; B29D 11/00894; B29D 11/00048; B29D 11/00317; B29D 11/0048; G02C 7/04

See application file for complete search history.

(56) References Cited

U.S. PATENT DOCUMENTS

| | | | |
|---|---|---|---|
| 3,536,386 | A | 10/1970 | Spivack |
| 4,536,554 | A | 8/1985 | Lim et al. |
| 4,582,402 | A | 4/1986 | Knapp |
| 4,704,017 | A | 11/1987 | Knapp |
| 4,983,702 | A | 1/1991 | Mueller et al. |
| 5,034,166 | A | 7/1991 | Rawlings et al. |
| 5,087,392 | A | 2/1992 | Burke et al. |
| 5,656,210 | A | 8/1997 | Hill et al. |
| 5,760,100 | A | 6/1998 | Nicolson et al. |
| 6,827,440 | B2 | 12/2004 | Ocampo |
| 7,001,542 | B2 | 2/2006 | Kim |

(Continued)

FOREIGN PATENT DOCUMENTS

| | | | |
|---|---|---|---|
| EP | 3067735 | A1 | 9/2016 |
| KR | 20090029991 | A | 3/2009 |
| KR | 102005230 | B1 | 8/2019 |

*Primary Examiner* — Travis S Fissel

(74) *Attorney, Agent, or Firm* — Nicholas Smith

(57) ABSTRACT

The invention is directed to a sandwiched colored hydrogel contact lenses lens, comprising: a pupil section, a generally annular iris section surrounding the pupil section, wherein the iris section having at least one colored, printed, opaque, intermittent pattern, wherein the said pattern is covered by a clear donut shape layer shape, wherein the clear donut shape layer shape is on inner surface of lens to the observer and has a thickness at least 25 μm. And the method make such lenses using a common polypropylene base curve (BC Mold 1) and two different front curve molds (FC Mold 1, FC Mold 2) that provided different volume gaps to accommodate the size requirements of the two layers.

8 Claims, 2 Drawing Sheets

(56) References Cited

U.S. PATENT DOCUMENTS

| | | | | |
|---|---|---|---|---|
| 7,550,519 | B2 | 6/2009 | Phelan | |
| 8,147,728 | B2 | 4/2012 | Quinn et al. | |
| 9,346,194 | B2 | 5/2016 | Morgan et al. | |
| 2006/0141100 | A1* | 6/2006 | Dimitrov | A21D 2/36<br>426/94 |
| 2020/0241325 | A1* | 7/2020 | Chalberg | G02C 7/04 |
| 2020/0376787 | A1* | 12/2020 | Zhang | C08L 83/04 |

* cited by examiner

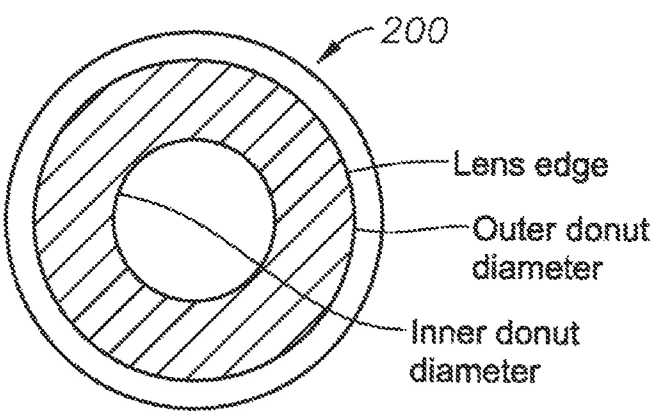
FIG. 1
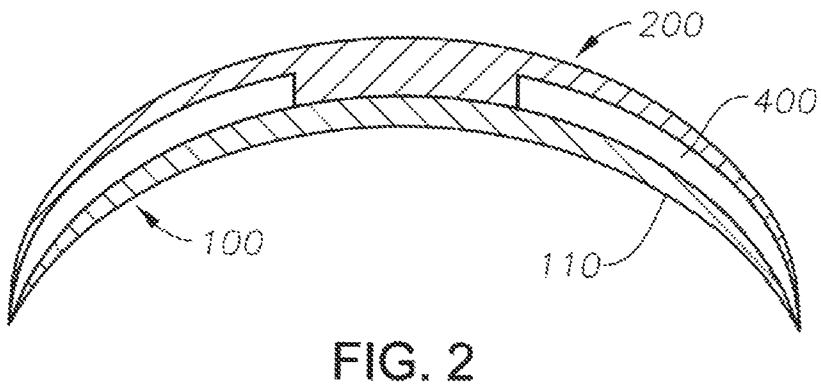
FIG. 2
400
100
110
FIG. 3

SANDWICHED COLORED HYDROGEL CONTACT LENSES

The present invention generally relates to a method for producing a sandwiched colored cosmetic contact hydrogel contact lenses. In addition, the present invention provides a sandwiched colored cosmetic hydrogel contact lenses produced according to a method of the invention.

BACKGROUND OF THE INVENTION

For cosmetic purposes, colored contact lenses having one or more colorants dispersed in the lens or printed on the lens are in high demand. These colored contact lenses enhance the natural beauty of the eye, or provide unique patterns on the iris of the wearer, or provide non cosmetic patterns. In general, there are two types of colored contact lenses. The first are contact lenses which use essentially transparent enhancement colors that allow the color of the natural iris to show through but combine with that natural color to produce a new appearance. Such tinted lenses are typically used to turn a light eye (e.g., green) to a slightly different hue (e.g., aqua). This class of colored lenses may not be able to change an underlying dark colored, brown iris to blue. The second category is the class of opaque colored lenses having a continuous opaque pattern that fully covers the iris or having an intermittent opaque pattern that does not fully cover the iris. Opaque colored contact lenses can effectively and substantially modify the wearer's eye color.

Methods of printing inks onto either contact lenses or the molds that are then used to make contact lenses. Both methods involve ink transfer printing. The second method of printing inks onto the molds that are then used to make contact lenses becomes more popular. According to this method the colored film to be transferred to the lens is first deposited on a surface of the mold wherein the lens is subsequently formed. The pattern of the liquid colored film can be provided by etching or lasering a metal or ceramic plate. The etched pattern is then filled with an appropriate ink, leveled out with a suitable doctoring device, and a soft silicone rubber transfer stamp or pad impressed thereupon to transfer the pattern on the pad's surface. The pad containing the image is then brought to the lens forming mold and depressed in the correct place to transfer the cosmetic pattern thus creating the colored film. The colored cosmetic film may then be subjected to a partial or full cure. Thereafter, lens forming material is added to the mold and actinically or thermally cured to form the contact lens whereby the colored film detaches from the molding surface and becomes integral with the body of the contact lens.

The pigment containing colored film is located on the top or bottom surface of the lens and pigment particles may direct contact with the conjunctiva or cornea. This direct contact may cause eye discomfort. A clear coat is typically utilized for encapsulating the various pigmented printed layers within the contact lens to avoid the direct contact of pigment as described in U.S. Pat. No. 9,346,194. However, sometimes the clear coat fails to cover the whole pigmented printed layers because the limited thickness and the uniformity of the clear coat.

Therefore, there is still a need for producing improved contact lenses to avoid the direct contact of pigment in colored film on the contact lens with eye.

SUMMARY OF THE INVENTION

In one aspect, in one aspect, the invention provides a method for producing sandwiched colored hydrogel Contact lenses, comprising the steps of:

(1) obtaining a male mold half, a first female mold half and a second female mold half, wherein the male mold half has a first molding surface defining the posterior surface of a contact lens to be molded, wherein the first female mold half has a second molding surface defining the front surface of a donut shape layer to be molded, wherein the second female mold half has a third molding surface defining the anterior surface of the contact lens to be molded, wherein the male mold half and the first female mold half are configured to receive each other such that an donut shape layer-molding cavity is formed between the second molding surface and a donut shape layer portion of the first molding surface when the male mold half is closed with the first female mold half, wherein the second female mold half and the male mold half are configured to receive each other such that a lens-molding cavity is formed between the first and third molding surfaces when the second female mold half is closed with the male mold half;

(2) dispensing an amount of a donut shape layer-forming composition on the second molding surface of the female mold half;

(3) placing the male mold half on top of the donut shape layer-forming composition in the female mold half and closing the male mold half and the first female mold half to form a first molding assembly comprising the donut shape layer-forming composition within the donut shape layer-molding cavity;

(4) curing the donut shape layer-forming composition in the donut shape layer-molding cavity of the first molding assembly to form a molded donut shape layer;

(5) separating the first molding assembly obtained in step (4) into the male mold half and the first female mold half with the molded donut shape layer that is adhered onto the first molding surface;

(6) printing at least one colored cosmetic pattern onto the molded donut shape layer;

(7) optionally curing the colored cosmetic pattern on the molded donut shape layer (8) dispensing a bulk lens-forming composition in the second female mold half with the printed molded donut shape layer adhered thereon in an amount sufficient for filling the lens-molding cavity, wherein the donut shape layer-forming composition is same or different from the bulk lens-forming composition;

(9) placing the male mold half on top of the lens-forming composition in the second female mold half and closing the male mold half and the second female mold half to form a second molding assembly comprising the bulk lens-forming composition and the molded donut shape-layer immersed therein in the lens-molding cavity;

(10) curing the bulk lens-forming composition in the lens-molding cavity of the second molding assembly to form an embedded contact lens that comprises the cosmetic iris pattern covered by the bulk lens-forming composition and donut shape-layer forming material, wherein the donut shape-layer has thickness larger than 10 μm.

(11) separating the second molding assembly obtained in step (10) into the male mold half and the second female mold half, with the embedded hydrogel contact lens adhered on a lens-adhered mold half which is one of the male and second female mold halves;

(12) removing the embedded hydrogel contact lens from the lens-adhered mold half.

In another respect, this invention relates to a sandwiched colored hydrogel contact lens, comprising: a pupil section, a generally annular iris section surrounding the pupil section, wherein the iris section having at least one colored, printed, opaque, intermittent pattern, wherein the said pattern is embedded between a bulk lens-forming composition and a donut shape-layer forming material, wherein a bulk lens-forming composition and a donut shape-layer forming material are the same or different, wherein the donut shape-layer has thickness larger than 10 μm.

These and other aspects of the invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

BRIEF DESCRIPTION OF THE DRAWINGS

FIG. 1 illustrates a top view of a female mold for molding a donut layer lens.

FIG. 2 illustrates a step to make donut shape layer in accordance with the present invention.

FIG. 3 illustrates an additional step to make donut shape layer in accordance with the present invention.

DETAILED DESCRIPTION OF THE PREFERRED EMBODIMENTS

Figure 4:
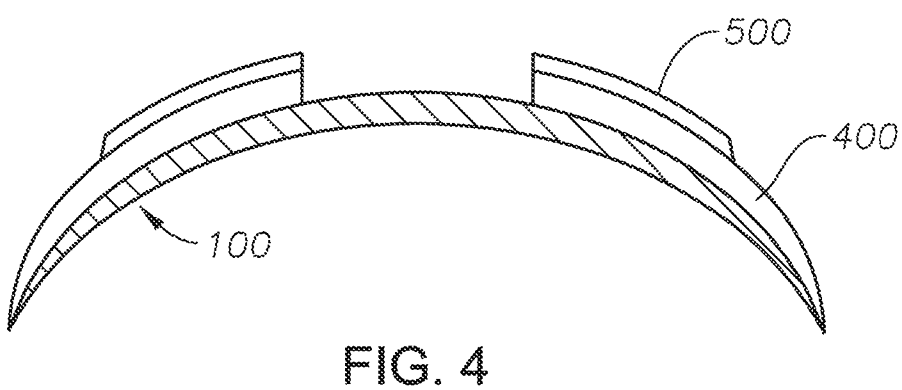
FIG. 4 illustrates a step to print a colored cosmetic pattern on the donut shape layer in accordance with the present invention.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact lens" refers to an object that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be tinted before printing any color patterns. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

The term "eye color" refers to the color of the iris.

The term "ordinary viewer" is intended to mean a person having normal 20/20 version standing about 5 feet from a person wearing the lenses of the invention.

The term "non-opaque" as used herein is intended to describe transparent or translucent color or a part of the lens that is uncolored or colored with transparent or translucent coloring.

A "donut shape" refers to an annular ring shape having a hole in the center and an annular region is the region between two concentric spheres surrounding the hole. The inner donut diameter approximately corresponds to the pupil area of the eye (typically 3-6 mm in diameter when a wearer puts on the contact lens. An outer donut ring (typically 6-9 mm in diameter) may also be designed to allow the edge area to be defined by the second molding surface.

A "thickness of donut shape layer" refers to the thickness measured at the edge of inner diameter of the annular ring.

A "bulk lens layer" refers to a layer formed with lens forming material and having no hole in the center. The donut shape layer-forming composition may be the same as or different from the lens-forming composition.

An "embedded cosmetic hydrogel contact lens" refers a hydrogel contact lens comprising at least one cosmetic pattern which is embedded fully within the hydrogel material of the hydrogel contact lens.

A "clear coat" to a coating on an object and having no pigment or dye image printed therein.

A "colored coat" refers to a coating on an object and having a color image printed therein.

A "colorant" means either one or more dyes or pigments or a mixture thereof that is used to print a pattern of colored elements on a contact lens.

"Dye" means a substance that is soluble in a solvent and that is used to impart color. Dyes are typically transparent or translucent and absorb but do not scatter light.

Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

"Hydrogel" means a cross-linked polymer having an equilibrium content between about 10 and 90 percent water.

A "lens-forming material" refers to a polymerizable composition which can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

The term "ethylenically unsaturated group" or "olefinically unsaturated group" is employed herein in a broad sense and is intended to encompass any groups containing at least one >C=C<group. Exemplary ethylenically unsaturated groups include without limitation acryloyl, methacryloyl, allyl, vinyl, styrenyl, or other C=C containing groups.

A "HEMA-based hydrogel" refers to a hydrogel obtained by copolymerization of a polymerizable composition comprising hydroxyethylmethacrylate (HEMA).

A "silicone hydrogel" refers to a hydrogel obtained by copolymerization of a polymerizable composition comprising at least one silicone-containing monomer or at least one silicone-containing macromer.

"Hydrophilic," as used herein, describes a material or portion thereof that will more readily associate with water than with lipids.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

A "print-on-mold process for producing colored contact lenses" refers to a process for molding a colored contact lens described in U.S. Pat. No. 5,034,166 to Rawlings et al. (herein incorporated by reference).

A "good transferability from a mold to a contact lens" in reference to an ink or a colored coat means that a color image printed on a molding surface of a mold with the ink can be transferred completely onto a contact lens cured (thermally or actinically) in that mold.

The term "surfactant," as used herein, refers to a surface-active compound as that term is well known in the art.

A "crosslinker" refers to a compound comprising two or more functional groups as they are known in the art. A crosslinker molecule can be used to crosslink two or more monomers or polymer molecules. Any known suitable crosslinkers can be used in the invention. Exemplary preferred crosslinkers include, without limitation, hexamethyl diisocyanate (HMDI), ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

In general, some current product does use a printed clear coat to entrap the printed layer. Although the ink does get covered by the printed clear coat, the ink layer is difficult to image using standard microscopy. This invention attempts to sandwiched the print layer between two layers of hydrogels materials.

In one aspect, the invention provides a method for producing sandwiched colored hydrogel Contact lenses, comprising the steps of:

(1) obtaining a male mold half, a first female mold half and a second female mold half, wherein the male mold half has a first molding surface defining the posterior surface of a contact lens to be molded, wherein the first female mold half has a second molding surface defining the front surface of a donut shape layer to be molded, wherein the second female mold half has a third molding surface defining the anterior surface of the contact lens to be molded, wherein the male mold half and the first female mold half are configured to receive each other such that an donut shape layer-molding cavity is formed between the second molding surface and a donut shape layer portion of the first molding surface when the male mold half is closed with the first female mold half, wherein the second female mold half and the male mold half are configured to receive each other such that a lens-molding cavity is formed between the first and third molding surfaces when the second female mold half is closed with the male mold half;

(2) dispensing an amount of a donut shape layer-forming composition on the second molding surface of the female mold half;

(3) placing the male mold half on top of the donut shape layer-forming composition in the female mold half and closing the male mold half and the first female mold half to form a first molding assembly comprising the donut shape layer-forming composition within the donut shape layer-molding cavity;

(4) curing the donut shape layer-forming composition in the donut shape layer-molding cavity of the first molding assembly to form a molded donut shape-layer;

(5) separating the first molding assembly obtained in step (4) into the male mold half and the first female mold half with the molded donut shape layer that is adhered onto the first molding surface;

(6) printing at least one colored cosmetic pattern onto the molded donut shape layer;

(7) optionally curing the colored cosmetic pattern on the molded donut shape-layer (8) dispensing a bulk lens-forming composition in the second female mold half with the printed molded donut shape layer adhered thereon in an amount sufficient for filling the lens-molding cavity, wherein the donut shape layer-forming composition is same or different from the bulk lens-forming composition;

(9) placing the male mold half on top of the lens-forming composition in the second female mold half and closing the male mold half and the second female mold half to form a second molding assembly comprising the bulk lens-forming composition and the molded donut shape-layer immersed therein in the lens-molding cavity;

(10) curing the bulk lens-forming composition in the lens-molding cavity of the second molding assembly to form an embedded contact lens that comprises the cosmetic iris pattern covered by the bulk lens-forming composition and donut shape-layer forming material, wherein the donut shape-layer has thickness larger than 10 μm.

(11) separating the second molding assembly obtained in step (10) into the male mold half and the second female mold half, with the embedded hydrogel contact lens adhered on a lens-adhered mold half which is one of the male and second female mold halves;

(12) removing the embedded hydrogel contact lens from the lens-adhered mold half.

It is discovered that such undesirable effects are eliminated by applying a two-stage curing process to ensure the print layer is embedded at least 10 (or 15 or 20 or 25) microns) thick in the contact lens away from the base curve surface. This method of the present application employed a common polypropylene base curve (BC Mold 1 or male mold) and two different front curve molds (FC Mold 1 or female mold 1, FC Mold 2 female mold 2) where the design of FC mold 1 controls the donut thickness, inner, and out donut diameter.

Note the clear donut shape layer in the curing first layer lens may be made using double-sided molding, but reusable molds (i.e. quartz, glass, silicone, aluminum) could also be used.

In order to have print entrapped in the lens bulk, some commercial colored silicone hydrogel colored cosmetic lens uses a printed clear coat layer. But its thickness is too thin to complete cover the pigments used in the colored cosmetic layer. The thickness of the clear coat layer is limited to less than 5 micron by using pad-printing method because ink pick up limitation based upon the thickness and surface tension of the ink.

The present application is also partly based on the discovery that by designing a new front curve mold for making a donut shape lens with a thickness at least 10 (or 15 or 20 or 25) microns and a two-step lens fabrication process, sandwiched colored cosmetic hydrogel contact lenses can be made. This method employed a common polypropylene base curve (BC Mold 1) and two different front curve molds (FC Mold 1, FC Mold 2) that provided different volume gaps to accommodate the size requirements of the two layers. Both the clear donut layer and lens bulk material could be made of the same material for best compatibility. Alternately, the clear donut layer could be made from a different material than the bulk.

Referring to FIG. 1, donut layer top view illustrates a donut female mold half (200) is designed so the central radius of the mold fits the radius of the male mold half (100), so the power of the final lens is defined by the bulk (typically 3-5 mm in diameter). This is defined as the inner donut diameter. The donut thickness is defined by the gap between the male and female mold halves bound by the inner and outer donut diameter edge. Optionally, the donut can be designed where the gap does not extend to the edge of the lens. This outer donut diameter (typically 6-9 mm in diameter) allows the final lens edge to be composed of bulk.

Referring to FIG. 2, the clear donut layer formulation is cast using conventional a dosing system, and the FC and BC molds are closed. The clear coat is then cured using UV or thermal energy.

This is accomplished by dispensing an amount of a donut shape layer-forming composition (400) on the second molding surface of the first female mold half (200);

then placing the male mold half (100) on top of the donut shape layer-forming composition in the first female mold half and closing the male mold half and the first female mold half to form a first molding assembly comprising the donut shape layer-forming composition within the donut shape layer-molding cavity;

further then curing the donut shape layer-forming composition in the donut shape layer-molding cavity of the first molding assembly to form a molded donut shape-layer.

Referring to FIG. 3, the first female mold half FC mold is removed and either discarded or cleaned and reused. Potentially, additional energy can be used to dry or finish curing the clear donut layer prior to printing.

This demolding step is accomplished by separating the first molding assembly obtained above into the male mold half (100) and the first female mold half (200) with the molded donut shape layer (400) that is adhered onto the first molding surface (110) of the male mold half. Note the same the male mold half (BC mold) is used throughout the entire process.

Referring to FIG. 4, the colored cosmetic print is applied using any conventional means, such as pad printing. Any numbers of print layers could be applied. The ink could be cured using light or thermal means. Alternatively, the ink could be formulated using an immiscible solvent from the lens bulk material formulation to prevent smearing of the ink without the need to cure the ink.

This printing step is accomplished by printing at least one colored cosmetic pattern (500) onto the molded donut shape layer (400);

And optionally curing the colored cosmetic pattern on the molded donut shape-layer.

Figure 5:
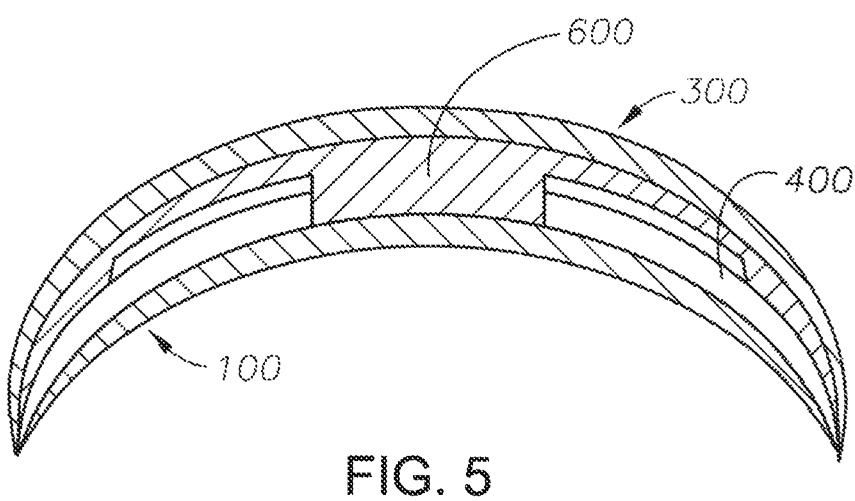
FIG. 5 illustrates a step to make an embedded (a sandwiched) colored cosmetic print in accordance with the present invention.

Referring to FIG. 5, the second FC mold is dosed with the lens bulk material formulation, and closed. The molds would need to be closed carefully to minimize shear forces applied to the ink through the bulk material formulation flow. The entire assembly is cured using conventional means (i.e. UV or thermal energy)

Figure 6:
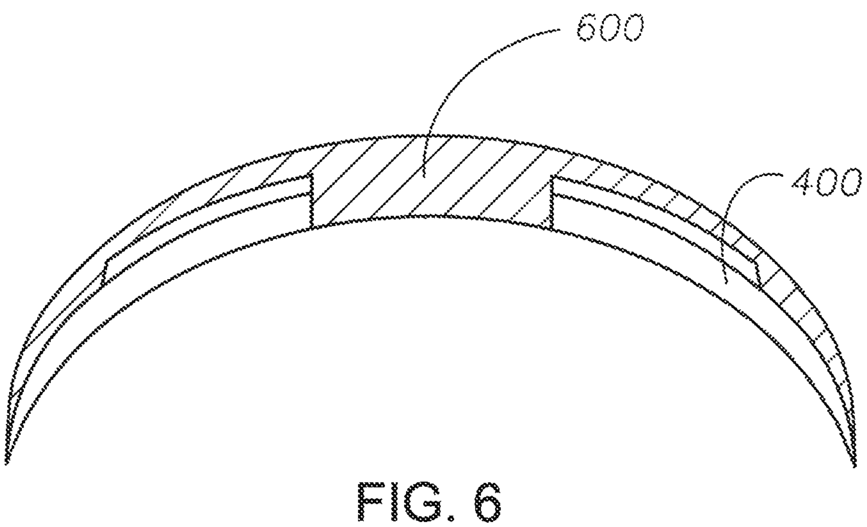
FIG. 6 illustrates a sandwiched cosmetic colored hydrogel contact lens.

This casting step is accomplished by dispensing a bulk lens-forming composition (600) in the second female mold half (300) with the printed molded donut shape layer (400) adhered thereon in an amount sufficient for filling the lens-molding cavity, wherein the donut shape layer-forming composition (400) is same or different from the lens-forming composition (600);

Then placing the male mold half (100) on top of the lens-forming composition (600) in the second female mold half (300) and closing the male mold half and the second female mold half to form a second molding assembly comprising the lens-forming composition and the molded donut shape-layer immersed therein in the lens-molding cavity;

Further then, curing the lens-forming composition in the lens-molding cavity of the second molding assembly to form an embedded contact lens that comprises the cosmetic pattern covered by the lens-forming composition and donut shape-layer forming material, wherein the donut shape-layer has thickness larger than 10 (or 15 or 20 or 25) μm; Referring to FIG. 6, after demolding and delensing, the entire composite lens is ready for extraction, hydration, and inspection.

This demolding step is accomplished by separating the second molding assembly above into the male mold half (100) and the second female mold half (300), with the embedded hydrogel contact lens adhered on a lens-adhered mold half which is one of the male (100) and second female mold (300) halves; Then removing the embedded hydrogel contact lens from the lens-adhered mold half.

In accordance with the present invention, at least one colored cosmetic patterns extending across a portion of the iris section is printed on the clear donut layer.

It should be understood that any shape of a zone, an area, a colored pattern, or the like in reference to a contact lens intends to refer to the shape of the zone, the area, the colored pattern, or the like projected onto a plane perpendicular to an axis passing through the apex of the contact lens in normal direction.

Any colorant can be used in printing a colored pattern of the invention, as long as the colorant can provide opaque colored dots. Exemplary colorants include pigments. The pigments should be small enough in size to scatter little visible light. Preferably, the size of pigment is smaller than about 1 micron.

In accordance with the invention, the ink comprises at least a colorant, a silicone-containing binder polymer.

A solvent can be water, an organic or inorganic solvent, a mixture of several organic solvents, or a mixture of water and one or more water soluble or water miscible organic solvents.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

In accordance with the invention, a silicone-containing binder polymer should comprise crosslinkable groups selected from the group consisting of ethylenically unsaturated groups, hydroxyl —OH, amino —NHR (wherein R is hydrogen or $C_1$ to C alkyl), carboxylic acid —COOH, epoxy, amide —CONHR, isocyanate, peroxy, perester, anhydride, alkoxysilane, silanol, acetoxysilane, silanes, halosilane, and combinations thereof. The color coat may or may not contain an adhesion promoter, largely depending on the type of crosslinkable groups of a silicone-containing binder polymer to be used.

Where the silicone-containing bind polymer in an ink comprises ethylenically unsaturated groups as crosslinkable groups, a colored coat printed on the molding surface of a mold can be cured actinically to form a colored film. There is no need for an adhesion promoter. Examples of such silicone-containing binder polymer are ethylenically functionalized derivatives of silicon-containing polymers, as disclosed in commonly assigned U.S. Pat. No. 7,550,519 (herein incorporated by reference in its entirety). The term "ethylenically functionalized" as used herein is intended to describe the introduction of ethylenically unsaturated groups into the silicone-containing polymer. The silicone-containing polymer to be ethylenically functionalized is preferably a copolymerization product of a polymerizable composition, which comprises (a) at least one hydrophilic vinylic monomer, (b) at least one functionalizing vinylic monomer containing at least one pendant functional groups, preferably selected from the group consisting of hydroxyl groups (—OH), primary amino groups (—$NH_2$), secondary amino groups (—NHR), carboxylic groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or 1), acid anhydride groups, and combinations thereof, and (c) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent. Ethylenically functionalizing of the silicone-containing polymer is carried out by reacting the silicon-containing polymer with an ethylenically functionalizing agent which comprises an ethylencially unsaturated group and a group capable of reacting with the functional groups of the silicone-containing polymer to form covalent linkages, as known to person skilled in the art. Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Where a silicone-containing binder polymer in an ink coat comprises crosslinkable groups selected from the group consisting of hydroxyl group —OH, amino group —NHR (wherein R is hydrogen or $C_1$ to C alkyl), carboxylic group —COOH, epoxy group, amide group —CONHR, and combinations thereof, an adhesion promoter may be included in the color coat for further improving color coating adhesion to the silicone hydrogel lens. Examples of such silicone-containing binder polymer are those disclosed in a commonly-assigned as disclosed in commonly assigned U.S. Pat. No. 8,147,728 (herein incorporated by reference in its entirety). Such silicone-containing binder polymer can be a copolymerization product of a polymerizable mixture including: (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; and (iii) at least one silicone-containing vinylic monomer or macromer. one or more components selected from the group consisting of a polymerization initiator (i.e., a photoinitiator or a thermal initiator), a chain transfer agent, and a solvent. The polymerizable mixture can also include a polymerization initiator (i.e., a photoinitiator or a thermal initiator), a solvent which is preferably the solvent used in an ink, and a chain transfer agent. The polymerizable mixture can optionally include a hydrophobic vinylic monomer, for example, such as, 2-ethoxyethylmethacrylate (EOEMA).

Examples of siloxane-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris (trimethylsiloxy) silane.

Any know suitable siloxane-containing macromer can be used. A particularly preferred siloxane-containing macromer is selected from the group consisting of Macromer A, Macromer B, Macromer C, and Macromer D described in U.S. Pat. No. 5,760,100, herein incorporated by reference in its entirety.

Nearly any hydrophilic vinylic monomer can be used in the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like. Among the preferred hydrophilic vinylic monomers are N,N-dimethylacrylamide (DMA), 2-hydroxyethylmethacrylate (HEMA), hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, and methacrylic acid.

Any know suitable vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof can be used as functionalizing vinylic monomer in the present invention. Preferred examples of such vinylic monomers includes methacrylic acid (MAA), acrylic acid, glycidylmethacrylate, glycidylacrylate, HEMA, HEA, and N-hydroxymethylacrylamide (NHMA).

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

In accordance with the invention, copolymerization reaction for preparing a binder polymer can be initiated by heat or actinic radiation (e.g., UV) in a polymerizable mixture which includes a solvent (e.g, ethanol or cyclopentanone), a thermal initiator (e.g., AIBN) or a photoinitiator, a chain transfer agent (e.g., ethyl mercaptan (EtSH)), a hydrophilic vinylic monomer devoid of functional groups (e.g. DMA), a functionalizing vinylic monomer having at least least one functional groups (e.g. HEMA, MAA, or glycidylmethacrylate), an alkoxysilane monomer (e.g. TRIS), and monomethacrylated polydimethylsiloxane. It might be preferable the polymerization reaction is not complete, thereby producing a binder polymer dissolved in a solvent which preferably contains some residual unreacted vinylic monomers. Polymerization mixtures that contain only binder and unconverted monomer might also be desirable since solvent would be eliminated. The unconverted monomer can be used to help control rheological properties of inks and be converted to polymer during ink cure and/or bonnet curing. A person skilled in the art will know well how to control polymerization level.

In accordance with the invention, an ink can also comprise one or more components selected from the group consisting of a thermal initiator, a photoinitiator, a dliluent, a surfactant, a humectant, an antimicrobial agent, an antioxidant agent, an anti-coagulating agent, and other additives known in the art.

In accordance with the invention, a diluent can be a solvent or a solution of one or more vinylic monomers.

An ink used in the invention should have a good adhesion to a silicone hydrogel contact lens. As used herein, "good adhesion to a contact lens or a silicon hydrogel contact lens" in reference to a colored coat or an ink means that the colored coat (with a color image) generated on the lens with the ink can pass a mechanical rubbing test, The mechanical rubbing test for assessments of ink adhesion. The mechanical rubbing test is made by evaluating test specimen cloths that are generated by placing a hydrated lens between layers of the cloth and applying a mechanical stress to the cloth. Two methods of applying mechanical stress are:

1) Compression of the cloth-lens assembly between two fixed rollers
2) Application of stress to the cloth-lens assembly using a commercially available devise designed for abrasive wear testing (Taber® Linear Abraser Model 5750, Taber Industries, Inc.)

Visible and microscopic (~10×) observation of colorant bleeding, smearing, or delamination indicates failure of the rub test.

In accordance with the invention, an ink can be applied to a molding surface of a mold according to any printing technologies, such as, for example, pad transfer printing (or pad printing), or inkjet printing. It is understood that other types of printing technologies could also be used to print molds.

In accordance with the present invention, a lens-forming fluid material can be a solution or a solvent-free liquid or melt at a temperature below 60° C.

In accordance with the present invention, a hydrogel contact lens-forming fluid material can be any silicone hydrogel contact lens formulations for making soft contact lenses. Exemplary commercial non-silicone hydrogel contact lenses formulations include without limitation the formulation of such as, lotrafilcon A, lotrafilcon B, balafilcon A, galyfilcon A, senofilcon A, narafilcon A, narafilcon B, comfilcon A, enfilcon A, asmofilcon A, can also be used in making SiHy contact lenses.

In accordance with the present invention, a hydrogel contact lens-forming fluid material can be any non-silicone hydrogel formulations for making soft contact lenses. Examples of commercial non-silicone hydrogel contact lenses include, without limitation, such as alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a lens-forming composition of the invention.

Where a lens-forming fluid material is a solution, it can be prepared by dissolving at least one silicone-containing vinylic monomer or macromer and at least one hydrophilic vinylic monomer and all other desired components in any suitable solvent known to a person skilled in the art, for example, including those described above.

In accordance with the present invention, any know suitable silicone-containing macromer, such as, for example those disclosed above, can be used to prepare soft contact lenses. Any known suitable silicone-containing vinylic monomers, such as, for example, those described above, can be used to prepare soft contact lenses.

Examples of suitable hydrophilic monomers are those described above.

In accordance with the present invention, a lens-forming material can further comprise various components, such as cross-linking agents, hydrophobic vinylic monomers, initiator, UV-absorbers, inhibitors, fillers, visibility tinting agents, antimicrobial agents, and the like.

In accordance with the invention, printing at least one colored cosmetic iris pattern onto the molded donut shape-layer. The donut shape layer-forming composition is same or different from the lens-forming composition, The colored cosmetic iris pattern can be applied according to any printing technologies, such as, for example, pad transfer printing (or pad printing), or inkjet printing. It is understood that other types of printing technologies could also be used to print molds. The color may contain certain patterns as illustrated in the U.S. Pat. No. 6,827,440 (herein incorporated by reference in its entirety).

In pad-transfer printing, a color image is placed or printed on a pad transfer device and the image on the pad transfer device is transferred to another surface, such as a polymer or lens (U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliche. The cliche is placed in a printer. Once in the printer, the cliche is inked by either an open inkwell doctoring system or by a closed ink cup sliding across the image. Then, a silicone pad picks up the inked image from the cliche and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

In another respect, this invention relates to a sandwiched colored hydrogel contact lenses lens, comprising: a pupil section, a generally annular iris section surrounding the pupil section, wherein the iris section having at least one colored, printed, opaque, intermittent pattern, wherein the said pattern is covered by a clear donut shape layer, wherein the clear donut shape layer is on inner surface of lens to the observer and has a thickness at least 25 μm.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

Example 1

This example describes synthesis of a photo-curable binder polymer

TABLE 1

| Components | Formulation (% by part) |
|---|---|
| DMA | 38.53 |
| VAZO-52 | 0.60 |
| TRIS-methacrylate | 24.49 |
| Betacon macromer | 21.47 |
| HEMA | 10.10 |
| 2-mercaptoethanol | 1.38 |
| IEM | 3.43 |

IEM = 2-isocyanatoethylmethacrylate

Two-step binder synthesis is described as below:

Step 1—copolymerization

All reactants (minus IEM) area reacted together at 50° for 24 hours in ethyl acetate; 2-mercaptoethanol controls the viscosity build up.

4-hydroxy TEMPO is added at 100 ppm to scavenge any radicals created in the remaining synthetic process.

Step 2—Functionalization to Macromer

IEM and catalyst (dibutyltin dilaurate) are added to functionalize the copolymer; this reaction is at 40° for 4 hours.

Finishing

The product is solvent exchanged to 1-propanol by evaporating off ethyl acetate.

Macromer ("binder polymer") is then incorporated into ink formulation.

Example 2

This example describes preparation of an ink formulation

| Components | Formulation (% by parts) |
|---|---|
| Binder from example 1 | 38 |
| Darocure 4265 | 2.0 |
| pigments | Varies by colors/5-10% |
| Solvent/ethanol | To 100 |

Both clear donut shape layer composition and lens bulk forming material are lotrafilcon B. The sandwiched silicone colored hydrogel contact lenses are produced by the method described above. A clear donut shape layer more than 10 (or 15 or 20 or 25) microns in thickness overlying the colored cosmetic iris pattern to encapsulate said colored cosmetic iris pattern between said clear donut shape layer and lens bulk layer. The thickness of clear donut shape layer can be easily adjusted by the gap between first front curve and base curve molds, and the donut width can be adjusted by changing the inner and outer donut diameter.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for producing sandwiched colored hydrogel contact lenses, comprising the steps of:

(1) obtaining a male mold half, a first female mold half and a second female mold half, wherein the male mold half has a first molding surface defining the posterior surface of a contact lens to be molded, wherein the first female mold half has a second molding surface defining the front surface of a donut shape layer to be molded, wherein the second female mold half has a third molding surface defining the anterior surface of the contact lens to be molded, wherein the male mold half and the first female mold half are configured to receive each other such that an donut shape layer-molding cavity is formed between the second molding surface and a donut shape layer portion of the first molding surface when the male mold half is closed with the first female mold half, wherein the second female mold half and the male mold half are configured to receive each other such that a lens-molding cavity is formed between the first and third molding surfaces when the second female mold half is closed with the male mold half;

(2) dispensing an amount of a donut shape layer-forming composition on the second molding surface of the first female mold half;

(3) placing the male mold half on top of the donut shape layer-forming composition in the first female mold half and closing the male mold half and the first female mold half to form a first molding assembly comprising the donut shape layer-forming composition within the donut shape layer-molding cavity;

(4) curing the donut shape layer-forming composition in the donut shape layer-molding cavity of the first molding assembly to form a molded donut shape-layer;

(5) separating the first molding assembly obtained in step (4) into the male mold half and the first female mold half with the molded donut shape layer that is adhered onto the first molding surface;

(6) printing at least one colored cosmetic pattern onto the molded donut shape layer;

(7) optionally curing the colored cosmetic pattern on the molded donut shape layer;

(8) dispensing a bulk lens-forming composition in the second female mold half with the printed molded donut shape layer adhered thereon in an amount sufficient for filling the lens-molding cavity, wherein the donut shape layer-forming composition is same or different from the bulk lens-forming composition;

(9) placing the male mold half on top of the lens-forming composition in the second female mold half and closing the male mold half and the second female mold half to form a second molding assembly comprising the bulk lens-forming composition and the molded donut shape-layer immersed therein in the lens-molding cavity;

(10) curing the bulk lens-forming composition in the lens-molding cavity of the second molding assembly to form an embedded contact lens that comprises the cosmetic iris pattern covered by the bulk lens-forming composition and donut shape-layer forming material, wherein the donut shape layer has a thickness larger than 10 μm,

(11) separating the second molding assembly obtained in step (10) into the male mold half and the second female mold half, with the embedded hydrogel contact lens adhered on a lens-adhered mold half which is one of the male and second female mold halves;

(12) removing the embedded hydrogel contact lens from the lens-adhered mold half.

2. The method for producing sandwiched colored hydrogel contact lenses of claim 1, wherein the donut shape layer has a thickness larger than 15 μm.

3. The method for producing sandwiched colored hydrogel contact lenses of claim 2, wherein the donut shape layer has a thickness larger than 20 μm.

4. The method for producing sandwiched colored hydrogel contact lenses of claim 3, wherein the donut shape layer has a thickness larger than 25 μm.

5. The method for producing sandwiched colored hydrogel contact lenses of claim 1, wherein the donut shape layer-forming composition and the bulk lens-forming composition are the same and are silicone hydrogel material.

6. The method for producing sandwiched colored hydrogel contact lenses of claim 5, wherein the silicone hydrogel material is selected from a group consisting of lotrafilcon A, lotrafilcon B, balafilcon A, galyfilcon A, senofilcon A, narafilcon A, narafilcon B, comfilcon A, enfilcon A, and asmofilcon A.

7. The method for producing sandwiched colored hydrogel contact lenses of claim 1, wherein the donut shape layer-forming composition and the bulk lens-forming composition are the same and are non-silicone hydrogel material.

8. The method for producing sandwiched colored hydrogel contact lenses of claim 1, wherein the non-silicone hydrogel material is selected from a group consisting of alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

* * * * *